US012587296B2

(12) United States Patent
Naseef

(10) Patent No.: US 12,587,296 B2
(45) Date of Patent: Mar. 24, 2026

(54) RADIO INTERFERENCE TEST SETUP AND METHOD

(71) Applicant: Rohde & Schwarz GmbH & Co. KG, Munich (DE)

(72) Inventor: Mahmud Naseef, Planegg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 594 days.

(21) Appl. No.: 17/970,633

(22) Filed: Oct. 21, 2022

(65) Prior Publication Data

US 2024/0137137 A1    Apr. 25, 2024
US 2024/0235705 A9    Jul. 11, 2024

(51) Int. Cl.
H04B 17/391    (2015.01)
H04B 17/00    (2015.01)
H04B 17/336    (2015.01)
H04B 17/382    (2015.01)

(52) U.S. Cl.
CPC ....... H04B 17/391 (2015.01); H04B 17/0085 (2013.01); H04B 17/336 (2015.01); H04B 17/382 (2015.01)

(58) Field of Classification Search
CPC .............. H04B 17/391; H04B 17/0085; H04B 17/336; H04B 17/382; H04B 17/345
See application file for complete search history.

(56) References Cited

U.S. PATENT DOCUMENTS 9,720,077 B1 *    8/2017    Sarpoolaki ............ G01S 13/882
9,802,701 B1 *    10/2017    Hawes ................. G01C 21/005

10,496,088 B2    12/2019    Johnson et al.
2017/0248947 A1 *    8/2017    Johnson .................. G01S 19/14
2018/0315320 A1 *    11/2018    Ouyang .................. H04L 67/12
2019/0368875 A1 *    12/2019    Lee ........................ H04W 12/79
2021/0157319 A1 *    5/2021    Stein ..................... G06V 20/176
2022/0187472 A1 *    6/2022    Cote ................... H04L 67/1097
(Continued)

OTHER PUBLICATIONS

Deviser—Ground to Air Integrated Testing System—FDD Interference Analysis by Deviser—YouTube Video Aug. 2, 2019: https://www.youtube.com/watch?v=FwaNUdMK4ec ; Way back machine Oct. 19, 2020 https://web.archive.org/web/20201019120825/https://www.youtube.com/watch?v=FwaNUdMK4ec; i.e. "Deviser" (Year: 2019).*

(Continued)

*Primary Examiner* — Edan Orgad
*Assistant Examiner* — Malick A Sohrab
(74) *Attorney, Agent, or Firm* — Westman, Champlin & Koehler, P.A.

(57)    ABSTRACT

The present invention relates to radio interference test systems and a radio interference test method for live recording and replaying RF inferences from the air. The present disclosure provides an easily deployable RF interference test setup for testing interference robustness or problematic interferers in particular in the approach to an airport or an airport runway. The present invention is based on the idea to employ specific non-commercial aerial vehicles, such as drones or aerial test vehicles, which are equipment with a suitable test equipment in order to be able to follow an approach path or flight path of a commercial plane for testing purposes.

20 Claims, 5 Drawing Sheets

(56) References Cited

U.S. PATENT DOCUMENTS

2022/0272533 A1*   8/2022   Lei ........................ H04W 12/08
2023/0092970 A1*   3/2023   Zhang ................... H04L 5/0048
                                                          370/277

OTHER PUBLICATIONS

Deviser—E8900A 5G Handheld Spectrum Analyzer; Specifications; © 2019 Deviser Instruments Incorporated. 780 Montague Expressway, Suite 701, San Jose, CA 95131. (Year: 2019).*
Agilent Technologies—Agilent PXT Wireless Communications Test Set—Users Guide (E6621A) (Year: 2013) (Year: 2013).*

* cited by examiner

Clk

109

203

204

201

210

212    211

205

208    207

206

202

209

RADIO INTERFERENCE TEST SETUP AND METHOD

TECHNICAL FIELD

The present invention relates to radio interference test systems and a radio interference test method.

BACKGROUND OF THE INVENTION

Air traffic control (ATC) is a service provided by a ground-based air traffic control system that directs civilian or military aircraft on the ground and through a given section of controlled airspace and who can provide advisory services to aircraft in non-controlled airspace. For this purpose, an ATC system is equipped with a complex information processing system that processes and controls various air traffic control data in order to provide the smooth operation of civilian or military airplanes. Communication between the various subscribers of the ATC system and the corresponding aircraft is, by its nature, wireless.

As with other communications systems, there is a need for providing test solutions for testing of the communications systems and devices used in the ATC system and in the surrounding of an airport. On the other hand, guaranteeing undisturbed and interference-free RF communication is an essential and indispensable prerequisite for trouble-free ATC and operation in the surrounding of an airport. This, however, limits the testing possibilities so that for the purpose of testing, only simulation based solutions are available so far.

U.S. Pat. No. 10,496,088 B2 discloses a system for the measurement, collection and analysis of radio signals that utilizes a drone. Here, the drone is trying to find the contours of the base ratio station for the purposes of determining coverage.

Against this background, there is a continuing, ongoing need for an improved radio interference test system and method that is preferably cost effective and/or easily deployable. In particular there is a need to provide a radio interference test system at an airport location for testing interference robustness or problematic interferers in the approach to an airport runway and in the surrounding of an airport.

SUMMARY OF THE INVENTION

The present disclosure provides radio interference test systems and a corresponding method having the features of the independent claims.

According to a first aspect, a radio interference test system configured to record lively and to replay RF inferences from an atmosphere of testing is provided. The radio interference test system comprising: an aerial vehicle that is either an unmanned aerial vehicle or a test aerial vehicle, the aerial vehicle comprising a radio communication infrastructure; a radio device which is configured to request for a wireless communication connection to the radio communication infrastructure; a test environment which is configured to live record and replay the RF inferences from the atmosphere of testing, the test environment comprising: an RF waveform recorder arranged within the aerial vehicle wherein the RF waveform recorder is configured to receive RF interferences generated by the radio communication infrastructure in response to the request for the wireless communication connection and wherein the RF waveform recorder is further configured to record a RF waveform from the received RF interferences; a memory device which is configured to store an information which comprises a recorded RF waveform.

According to another aspect, a further radio interference test system configured to record RF inferences lively along a flight path is provided. The radio interference test system comprising: an aerial vehicle that is either an unmanned aerial vehicle or a test aerial vehicle; an RF waveform recorder that is configured to be arranged within the aerial vehicle and that is further configured to match a capacity limit of the aerial vehicle; a memory device which is configured to store an information which comprises a recorded RF waveform; and a radio device which is configured to request for a wireless connection to a radio communication infrastructure.

According to a further aspect, a radio interference test method for live recording and replaying RF inferences from an atmosphere of testing is provided: The radio interference test method comprising: providing an aerial vehicle that is either an unmanned aerial vehicle or a test aerial vehicle, the aerial vehicle comprising a radio communication infrastructure; establishing a wireless communication connection to the radio communication infrastructure using a radio device; live recording and replaying the RF inferences from the atmosphere of testing, comprising: receiving a RF interferences generated by the radio communication infrastructure in response to the request for the wireless communication connection; recording a RF waveform from the received RF interferences; and storing an information which comprises a recorded RF waveform.

According to the present invention, an aerial vehicle specifically designed and configured for testing is provided. For this test purpose, the aerial vehicle comprises or may be equipped with an RF waveform recorder wherein the RF waveform recorder is configured with regard to its weight and dimensions such to match the capacity limits of the aerial vehicle. For example, in case a standard drone is used, only a small, miniaturized light weight RF waveform decoder is needed. In case of a larger drone such as the ones used for military applications a larger portable or non-portable regular RF waveform recorder may be used.

The present disclosure provides an easily deployable RF interference test system for testing interference robustness or problematic interferers in particular in the approach to an airport, an airport runway or generally to any kind of landing zones in particular for civilian aerial vehicles. The present invention is based on the idea to employ specific non-commercial aerial vehicles, such as drones or aerial test vehicles, for this purpose.

The radio interference test system according to aspects of this disclosure is cost effective and easily deployable at various airport locations or civilian landing zones around the world. In particular, the test system is very easy to retrofit at any time.

Further, the radio interference test system according to aspects of this disclosure provides a cost effective and repeatable way of testing. In particular it can be repeated regularly in order to track changes as the complexity of the RF environment evolves.

Moreover, the radio interference test system according to aspects of this disclosure is flexible and can be deployed either to record RF data using simulated transmit (TX) signaling to the aerial vehicle or by connecting the aerial vehicle live to a wireless communication network and recording the resulting RF spectra.

The test method according to aspects of this disclosure is frequency band agnostic so that it can be used for all frequency bands of interest.

Advantageous configurations and developments emerge from the further dependent claims and from the description with reference to the figures of the drawings.

According to an aspect of this disclosure, the capacity limit of the aerial vehicle is configured such to carry the components of the test environment only, which means that the aerial vehicle is substantially configured to conduct the test and as such is not configured to receive or transport cargo or passengers other than needed for the test. This way, the aerial vehicle may be designed and optimized for test purposes only and no unnecessary additional weight is carried by the aerial vehicle. For example, in case of a very small aerial vehicle, such as a commercial drone, a miniaturized RF waveform recorder may be used, for example the frequency selective power sensor NRQ6 of Rohde & Schwarz. In case of bigger aerial vehicles or drones, such as a defensive-like helicopter or plane, then a portable RF waveform recorder, such as the spectrum analyzer FSH of Rohde & Schwarz, or even a regular spectrum analyzer, such as the FSW of Rohde & Schwarz, or an oscilloscope may be used. This way, the test conditions and especially the test costs can be optimized.

According to a further aspect of this disclosure, the test environment or at least its RF waveform recorder comprises a remote module. The test environment or its RF waveform recorder, respectively, are configured to be remote controlled via the remote module. This way, preferably no additional person is needed for conducting the test and for the operation of the test environment or its RF waveform recorder. Consequently, a weight optimized aerial vehicle may be used for test purposes.

According to an aspect of this disclosure, the test environment or at least its RF waveform recorder comprises a test software module which comprises a test routine. The test software module is configured to operate the RF waveform recorder independently based on the test routine stored in the test software module. Also for this test scenario, preferably no crew or staff is needed on board of the aerial vehicle for the operation of the test environment or its RF waveform recorder. Thus, also for this test scenario a weight optimized aerial vehicle may be used for test purposes.

According to an aspect of this disclosure, the unmanned aerial vehicle is a non-commercial drone. A drone is an aerial vehicle without any human pilot, crew, or passengers on board. The flight of drones may operate under remote control by a human operator, or with various degrees of autonomy, such as autopilot assistance, up to fully autonomous aircrafts that have no provision for human intervention and that are operated using artificial intelligence. The drone may be a plane or a helicopter.

According to a further aspect of this disclosure, the test aerial vehicle is a test helicopter or a test plane. Test helicopters and test planes are manned or unmanned, non-commercial aerial vehicles that are specifically configured for testing purposes. Employing a helicopter (either a test helicopter or a helicopter drone) may be advantageous for situation where the test and measurement takes some time so that the aerial vehicle has to stay for some test time at the same measurement position. Employing a helicopter is additionally advantageous for situations where the aerial vehicle does not need to follow a predefined approach route for executing the RF measurement and testing and instead goes directly to one or more specific, predetermined waypoints.

According to a further aspect of this disclosure, the aerial vehicle is configured to power at least one of: at least one component of the test environment within the aerial vehicle;

the communication infrastructure of the unmanned vehicle. This way, smaller batteries for the test environment and communication infrastructure, respectively, are required, which additionally reduces the weight of the aerial vehicle.

According to a further aspect of this disclosure, the communication infrastructure is an emulated communication infrastructure that is configured to emulate the communication infrastructure at the location of an airport or landing zone and/or within the aerial vehicle or at least parts of them. By employing an emulated communication infrastructure it is possible to generate emulated RF interferences.

According to a further aspect of this disclosure, the communication infrastructure is a real communication infrastructure at the location of an airport or landing zone and/or within the aerial vehicle.

According to a further aspect of this disclosure, the components of the test environment, such as the RF waveform recorder and the memory device, are at least partially part of the aerial vehicle.

According to a further aspect of this disclosure, the RF waveform recorder includes at least one of: a power meter, such as the NRQ measurement apparatus of Rohde & Schwarz, in particular with I/Q signal measurement; a digitizer; a portable or non-portable vector signal analyzer (VSA); a signal and/or spectrum analyzer, such as the portable spectrum analyzers FSH of Rohde & Schwarz or the table top spectrum analyzers of Rohde & Schwarz; an oscilloscope.

According to a further aspect of this disclosure, the RF waveform recorder is a miniaturized RF waveform recorder that is installed in the unmanned aerial vehicle. Miniaturized RF waveform recorders are portable, very small and light electronic apparatuses in the range of some few kilograms to less than 1 kilogram weigh and with reduced power consumption in the range of some 10 Watts to less than 10 Watt. These miniaturized RF waveform recorders may easily be placed in an unmanned aerial vehicle or small manned test aerial vehicle.

According to a further aspect of this disclosure, the communication infrastructure or the RF waveform recorder within the aerial vehicle comprises the memory device. Thus, the memory device is part of aerial vehicle.

According to a further aspect of this disclosure, the radio device comprises the memory device. This way, the same radio device can serve as a memory for the test environment.

According to a further aspect of this disclosure, the radio device is a smartphone or a smart tablet. In particular, the radio device is a 3GPP based smartphone or 3GPP based tablet device that are configured to connect to the communication infrastructure.

According to a further aspect of this disclosure, the radio device and the communication infrastructure each comprise an embedded SIM. An embedded SIM—or shortly eSIM—is a form of programmable SIM card that is embedded directly into the radio device. Instead of an integrated SIM located on a removable universal integrated circuit card (UICC), typically made of PVC, an eSIM consists of software installed onto an embedded UICC chip permanently attached to the radio device. Once an eSIM carrier profile has been installed on an embedded UICC it operates the same as a physical SIM. Additionally, the eSIM may be programmed such that it enables the radio device and the communication infrastructure, respectively, to connect to a plurality of different network operators.

According to a further aspect of this disclosure, the embedded SIM is configured such to enable simultaneous communication connections to different radio devices, base stations and network operators.

According to a further aspect of this disclosure, the memory device is an electronic data storage unit which is configured to store the information which comprises the recorded RF waveform.

In particular, the memory device may be a semiconductor memory, such as a DRAM, a DDR-RAM, a graphical RAM or the like. The memory device may also be a USB memory stick, a memory or smart card, a memory disc, such as a DVD, laser disc or the like.

The radio interference test system further comprises a radar altimeter that comprises an altimeter antenna. A radar altimeter, also called a radio altimeter, electronic altimeter, reflection altimeter, or low-range radio altimeter, is an RE device that is configured to measure the altitude above the terrain presently beneath the aerial vehicle. The measurement is typically done by timing how long it takes for a beam of radio waves to travel from the aerial vehicle to the ground surface, reflect there, and return back to the aerial vehicle. This type of altimeter provides the distance between the antenna and the ground directly below it. According to a further aspect of this disclosure, the altimeter antenna is mounted at a bottom side of the aerial vehicle. This is a preferably and realistic antenna position, in particular since the surrounding surface of the antenna is here similar to the ones in a plane. This way, cabling from the antenna to the test environment is as short as possible so that there are minimal signal losses due to the cabling. In addition, this also reduces the weight. Preferably, a SMA connector of the antenna is directly connected to the test environment which additionally reduces the wiring.

According to a further aspect of this disclosure, the radar altimeter comprises a validation module that is configured to at least qualify and/or validate radar altimeter readings, e.g. in case other interference signals are present in the background. This way, it is possible to provide very reliable altimeter information which are helpful for the proper functioning of other systems or components that need those altimeter information for their operation.

According to a further aspect of this disclosure, during test a flightpath of the aerial vehicle is controlled from a ground station. The idea here is to replicate a flight path of a commercial aircraft and derive a corresponding interference profile along this flight path. This derived interference profile provides an approximation of the real interference profile which would have been generated by commercial aircraft and its environment in the same or a comparable scenario.

According to a further aspect of this disclosure, a flightpath of the aerial vehicle is automated via waypoints. For example, the aerial vehicle, such as a drone or a test plane, are programmed such to move to a predefined location. In case the aerial vehicle is a helicopter or a helicopter drone, then it may stay at this exact location for some time in order to execute the test and after the test it may move to the next predefined test location. In case the aerial vehicle is a drone or a test plane, then it may stay in an area close to the predefined test location, e.g. by closely circling around the test location, in order to execute the test. In both cases, no operator is needed to do many different flight approach paths. In addition, this also ensures that the test scenario is reproducible and thus comparable. Again, also with this approach an interference profile generated by a commercial aircraft can be replicated.

According to a further aspect of this disclosure, the radio interference test method further comprises: replaying the recorded RF waveform in a lab for various aerial systems and aerial vehicles that are subject to interference from the recorded RF waveform. In particular, the recorded RF information from at least one of the test locations can be played back in the lab on an altimeter and can then be checked for any deviation in performance.

Where appropriate, the above-mentioned configurations and developments can be combined in any manner. Further possible configurations, developments and implementations of the invention also include combinations, which are not explicitly mentioned, of features of the invention that have been described previously or are described in the following with reference to the embodiments. In particular, in this case, a person skilled in the art will also add individual aspects as improvements or supplements to the basic form of the present invention.

CONTENT OF THE DRAWINGS

The present invention is described in greater detail in the following on the basis of the embodiments shown in the schematic figures of the drawings, in which:

FIG. 4 shows an apparatus for measuring and analyzing a radio frequency signal;

FIG. 7 shows another example of a test and measurement instrument.

Figures 1, 1A:
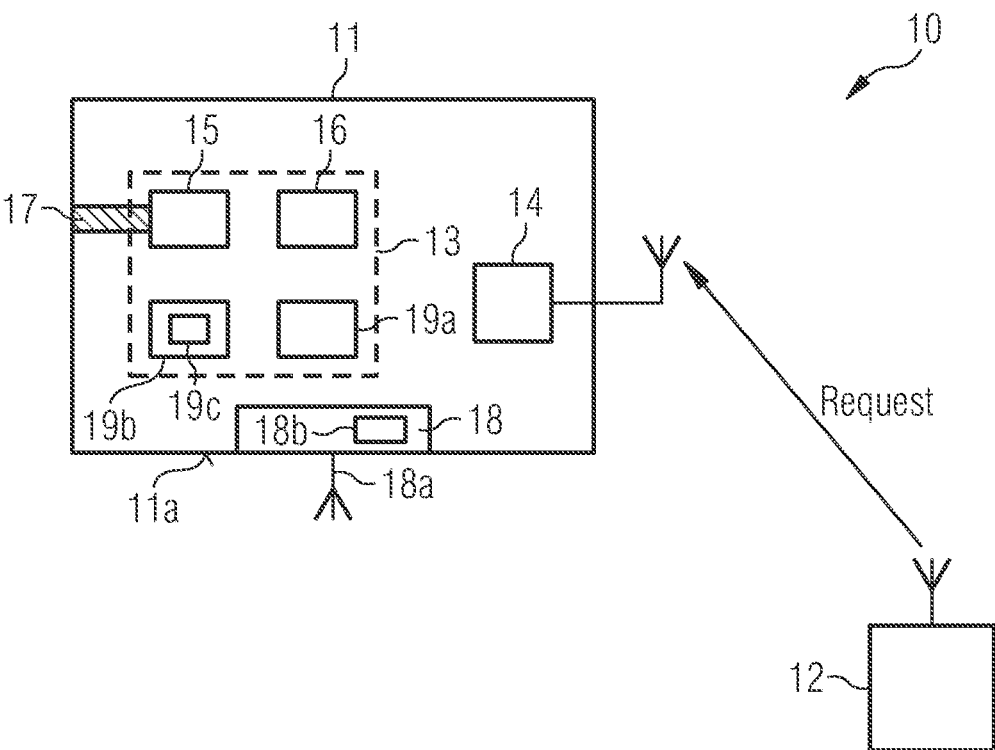
FIG. 1 shows a block diagram of a radio interference test system according to an aspect.
FIG. 1A shows a block diagram of a radio interference test system according to a further aspect.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

FIG. 1 shows a block diagram of a radio interference test system according to an aspect. The radio interference test system which is denoted by reference numeral 10 is configured to provide live recording and replaying RF inferences from the air.

The radio interference test system 10 comprises an aerial vehicle 11, a radio device 12 and a test environment 13.

The aerial vehicle 11 may be an unmanned aerial vehicle such as a drone or a manned or unmanned test aerial vehicle, such as a test helicopter or test plane. In any case the aerial vehicle 11 serves for testing purposes and as such must not be regarded as a commercial aerial vehicle. The aerial vehicle 11 comprises a radio communication infrastructure 14. The capacity limit of the aerial vehicle 11 is configured such to carry substantially only the components or the parts of the test environment 13 within the aerial vehicle 11 and the radio communication infrastructure 14.

The radio device 12 which may be a smart phone or a tablet is configured to send a request to the aerial vehicle 11 in order to establish a wireless communication connection to the aerial vehicle's 11 radio communication infrastructure 14. The radio device 12 may be at a ground position, e.g. as part of the ATC system or a base station at an airport location or landing zone. The radio device 12 may, however, also be at any location outside the airport or landing zone. Preferably, the radio device 12 is—during testing—within the aerial vehicle 11.

The test environment 13 is configured to live record and replay RF inferences from the air. For this purpose, the test environment 13 is—at least for the most part—located within the aerial vehicle 11. The test environment 13 comprises an RF waveform recorder 15 and a memory device 16.

The RF waveform recorder 15 is firstly configured to receive any RF interferences. For this purpose, the RF waveform recorder 15 includes a specific RF receiver (not shown in FIG. 1). The RF interferences received via the RF receiver may be generated by the radio communication infrastructure 14 in response to the received request for a wireless communication connection. Additionally or alternatively, the received RF interferences may also be caused by other interference sources in the surrounding of the aerial vehicle 11. Additionally or alternatively, the received RF interferences may also be emulated interferences which are transmitted by the radio device 12. The RF waveform recorder 15 is secondly configured to record a RF waveform from the received RF interferences.

The memory device 16 is configured to store an information, such as a digitized data stream, that comprises the recorded RF waveform. This information can stored in any form, such as storing the actual I/Q waveform samples, or by converting the received interference information via fast Fourier transformation (FFT) into a suitable spectrogram and then saving a series of images of these spectrograms etc.

In the example of FIG. 1, the test environment 13 is arranged in the aerial vehicle 11 which is indicated with the dotted lines in FIG. 1. However, this is not required or necessary. Instead, besides the RF waveform decoder, all other components of the test environment 13 or parts thereof may also be arranged outside the aircraft, e.g. on the ground.

FIG. 1A shows a block diagram of a radio interference test system according to a further aspect. The radio interference test system in FIG. 1A corresponds to the one shown in FIG. 1. In addition, the radio interference test system in FIG. 1A comprises the following components and features:

The aerial vehicle 11 comprises a test location. The RF recorder 15 is positioned at the test position and is fixedly installed there, for example by means of suitable mounting means 17. The mounting means 17 which are in turn mounted on the chassis of the aerial vehicle 11 ensure that the RF recorder 15 is securely stowed during the flight and especially during duration of the test to ensure safe test conditions. For example, the mounting means 17 can be a corresponding installation cabinet or a rack with a lock.

The aerial vehicle 11 further comprises a radar altimeter 18 that comprises an altimeter antenna 18a. The altimeter antenna 18a is mounted at a bottom side 11a of the aerial vehicle 11. In the example shown in FIG. 1, the radar altimeter 18 further comprises a validation module 18b. The validation module 18b is configured to qualify and/or validate the radar altimeter readings derived by the radar altimeter 18.

The test environment 13 (or preferably its RF waveform recorder 15) within the aerial vehicle 11 comprises a remote module 19a. By employing the remote module 19a it is possible to remote control the test environment 13 or its RF waveform recorder 15, respectively, so that the test may be done in the absence of any test crew on board of the aerial vehicle 11.

Additionally or alternatively, the test environment 13 (or preferably its RF waveform recorder 15) within the aerial vehicle 11 comprises a test software module 19b. The test software module 19b comprises a test routine 19c stored in a memory of the test software module 19b. The test software module 19b is configured to operate the RF waveform recorder 15 independently based on the test routine 19c.

Figure 2:
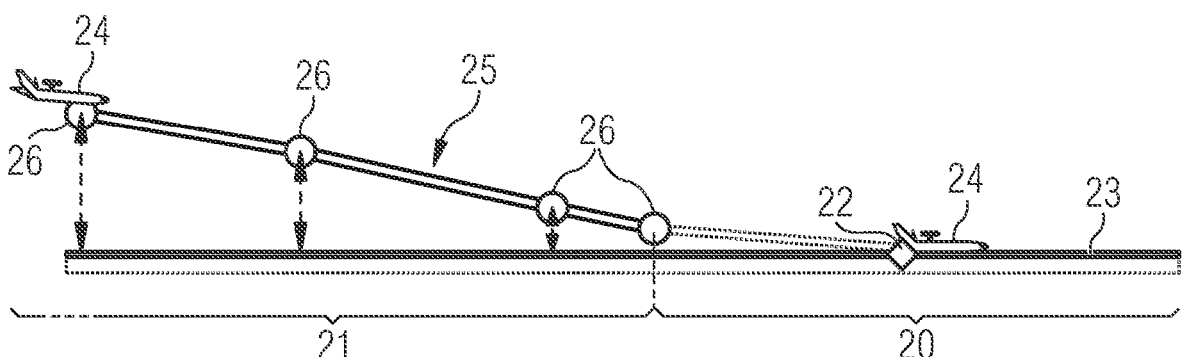
FIG. 2 shows a schematic diagram for illustrating the mode of operation of the radio interference test system as shown in FIG. 1.

FIG. 2 shows a schematic diagram for illustrating the mode of operation of the radio interference test system as shown in FIG. 1.

Reference symbol 20 denotes a landing zone for civilian aerial vehicles, such as an airport area or a helicopter landing area. Reference symbol 21 denotes an approach area around the airport area 20. A base station 22 is provided at the ground 23 of the airport area 20. This base station 22 can be a ground-based transmitter station 22 as part of the airport's ATC system (not shown in FIG. 2). By means of this base station 22, wireless over the air (OTA) communication is performed with other ATC participants and/or with arriving and departing aircrafts.

In FIG. 2, the typical approach route of an approaching civil aircraft 24, such as a cargo plane or passenger aircraft, is indicated by line 25. An approaching aircraft 24, which is guided by control instructions of an ATC operator, should usually follow this approach route 25 more or less exactly, although minor deviations from this approach route 25, e.g. due to weather conditions or the manual flight control of the pilot, are not unusual.

The present invention now enables on-site live measurement and testing of RF interferences along this approach route 25 using an aerial vehicle 11 equipped with the test environment 13 corresponding to that shown in FIG. 1. Using this test system, it is now possible to perform the live measurement. For this purpose, the aerial vehicle 11 equipped with the test equipment 13 is flying along the approach route 25 in order to record and store the respective prevailing RF interference signals during the flight of the aerial vehicle 11. These RF interference signals can be evaluated immediately or later in the laboratory.

In addition, the base station 22 can also contact the communications infrastructure within the aerial vehicle 11 via an OTA communications link to capture and later analyze any RF interferences generated by that communication as well.

Instead of continuously measuring RF interference signals, it is preferably sufficient that the aerial vehicle 11 is only brought to predefined positions 26 along the approach route 25 to make the corresponding measurements of RF interferences there. This option is advantageous in particular in those cases where the RF measurement takes some time. For this purpose it is advantageous that the aerial vehicle 11 is a helicopter drone or a test helicopter which is configured to dwell some time at one and the same predefined positions 26 along the approach route 25.

The on-site live measurement described above is not necessarily limited to the measurement of RF interferences along the approach route 25, but can of course also be used for live measurement and testing of RF interferences along the departure route or any other flight routes of an aerial vehicle 11.

Figure 3:
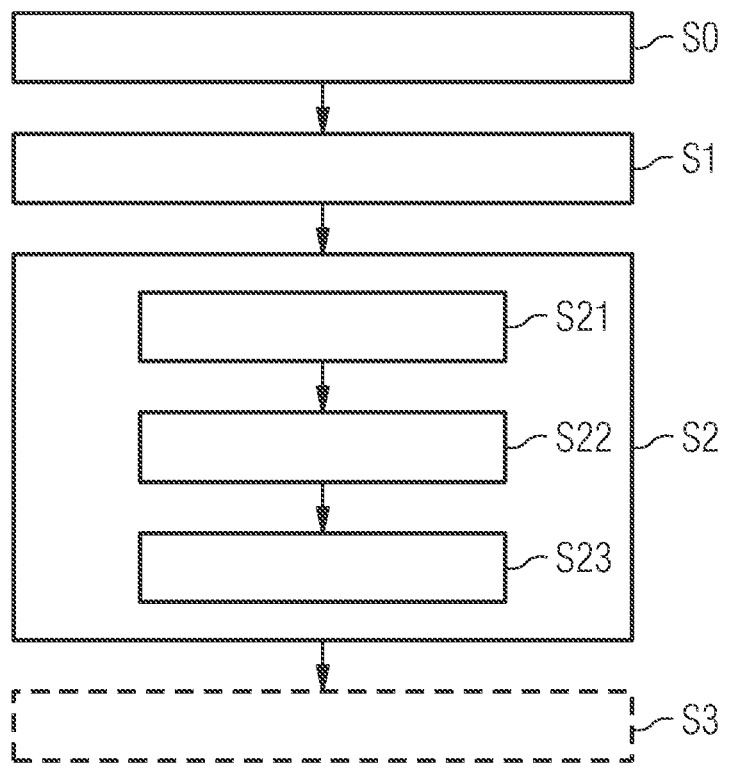
FIG. 3 shows a flow chart of a radio interference test method according to a further aspect.

FIG. 3 shows a flow chart of a radio interference test method for live recording and replaying RF inferences from the atmosphere of testing according to a further aspect.

In an initial step S0, an aerial vehicle that is either an unmanned aerial vehicle or a test aerial vehicle is provided. The aerial vehicle comprises a radio communication infrastructure.

In a subsequent step S1, a wireless communication connection to the radio communication infrastructure is established via a radio device.

In the next step S2, live recording and replaying RF inferences from the atmosphere is executed. This step S2 comprises the following sub-steps:

Sub-Step 21:

Receiving RF interferences generated by the radio communication infrastructure in response to the establishing of the wireless communication connection and/or from other RF interferences in the surrounding of the aerial vehicle.

Sub-Step S22:

Recording a RF waveform from the received RF interferences.

Sub-Step S23:

Storing an information which comprises—amongst others—the recorded RF waveform.

According a further subsequent step S3, the recorded RF waveform is replayed in a lab for various aerial systems and/or aerial vehicles that are subject to interference from the recorded RF waveform. Since this step S23 is not compulsory, it is depicted in dotted lines in FIG. 3.

Figure 4:
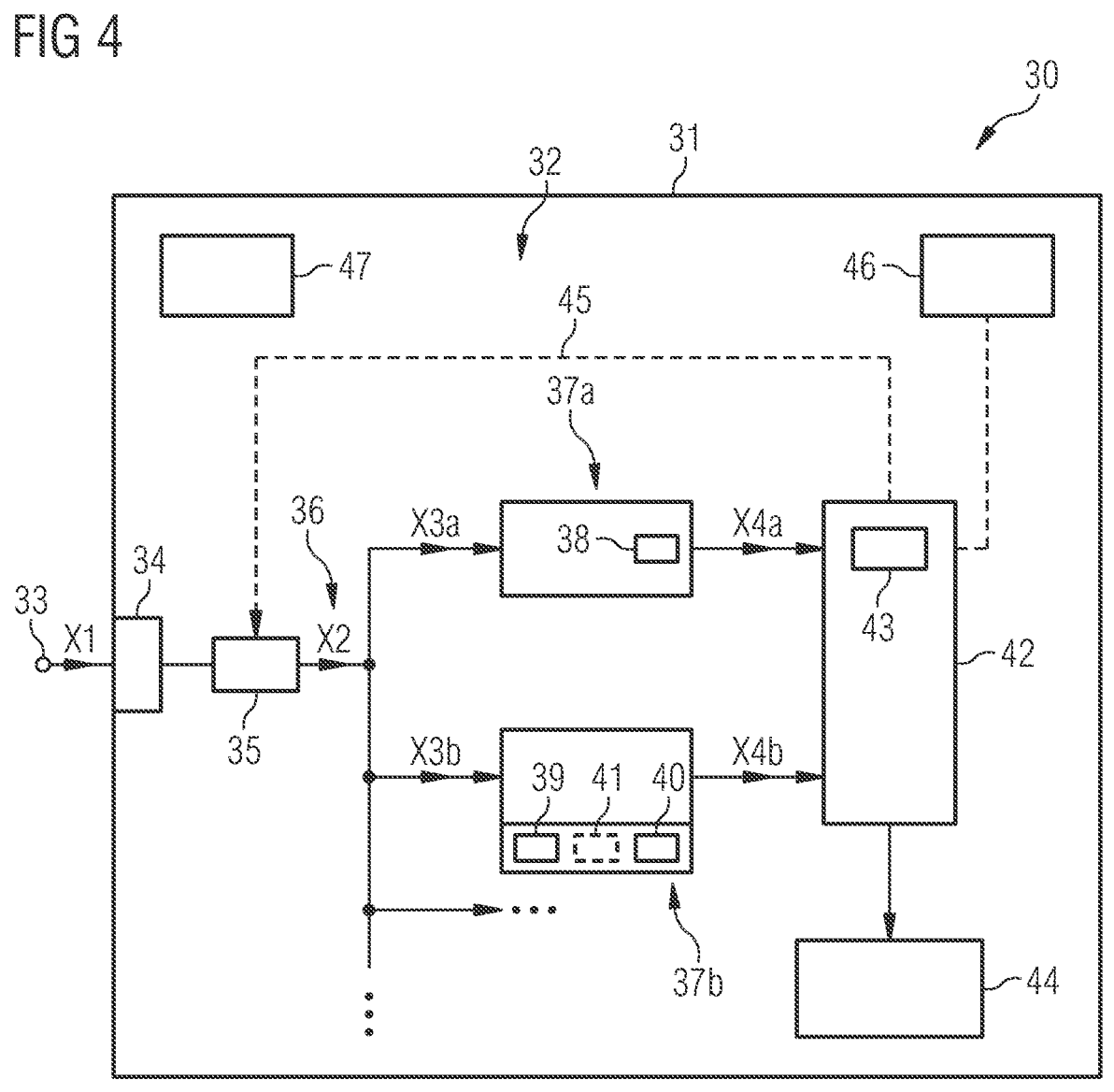

FIG. 4 shows an apparatus for measuring and analyzing a radio frequency (RF) signal, in particular for measuring RF power in the RF signal.

The apparatus 30 comprises the functionality of a power meter, such as the NRQ measurement apparatus of Rohde & Schwarz. The power meter apparatus 30 may be included in a RF waveform recorder, such as the RF waveform recorder 15 of the test environment 13 which is described above with regard to FIG. 1.

The apparatus 30 comprises a housing 31 that encompasses several electric and electronic components 32 which will be described hereinafter.

The apparatus 30 has an input 33 as part of an I/O interface 34 for receiving a RF signal X1, e.g. a RF signal generated by an external device under test (not shown in FIG. 4). The I/O interface 34 is connected with an adjustable attenuator 35 that is configured to process and attenuate the received RF signal X1 which ensures that the received RF signal X1 can be processed internally.

The attenuator 35 is connected via an internal splitter 36 that is configured to split the attenuated RF signal X2 and to forward the split RF signal to several measurement paths 37a, 37b. In the example of FIG. 4, two measurement paths 37a, 37b are shown, however, it goes without saying that the apparatus 30 may also comprise only one measurement path or a plurality of measurement paths 37a, 37b with the same or with different functionality. In case of only one measurement paths, no splitter 36 is needed.

In the example of FIG. 4, the first measurement path 37a is configured to process wide bandwidth and the second measurement path 37b is configured to process small bandwidth. Accordingly, both measurement paths 37a, 37b are configured to process different signals with regard to the bandwidth.

The first measurement path 37a for wide bandwidth comprises a first sampler 38 which is configured to digitize the split analog signal X3a for further analyzing purposes.

The second measurement path 37b for small bandwidth comprises a down-converter 39 that ensures that the split analog signal X3b received from the splitter 36 is down-converted wherein a certain frequency range or a certain frequency span may be selected. The down-converter 39 ensures an appropriate frequency selection for further analysis investigations. The second measurement path 37b further comprises a second sampler 40 which is configured to digitize the down-converted split analog signal for further analyzing purposes.

Alternatively or additionally to the down-converter 39, the second measurement path 37b may comprise a suitable filter 41 connected downstream to the down-converter 39. The filter 41 is preferably adjustable.

In some embodiments, the certain frequency range may be selected from the overall broadband frequency range of the received RF signal. Hence, the small band-width signal X3b processed by the measurement path 37b corresponds to a portion of the received RF signal X1.

In addition, the apparatus 30 comprises an analysis and measurement unit 42 that is connected downstream the measurement paths 37a, 37b. The analysis and measurement unit 42 is configured to receive via the measurement paths 37a, 37b the respective digitized bandwidth signals X4a, X4b and to retrieve and analyze the information from these signals X4a, X4b.

The analysis and measurement unit 42 is configured to measure the power of a least one of the signals, namely the digitized small bandwidth signal X4b and/or the digitized wide bandwidth signal X4a. In some preferred embodiments, the respective measurements are done simultaneously so that the measured information is obtained directly. This enables a combination and an alignment of the obtained information from the different measurements. According to an alternative operation mode, the user may select a sequential measurement mode, where the digitized small bandwidth signal X4b and the digitized wide bandwidth signal X4a are measured in a subsequent manner.

The analysis and measurement unit 42 may comprise a diode and/or a thermal component (not shown in FIG. 4) for measuring the power of the wide bandwidth signal X4a. Thus, the diode and/or the thermal component are assigned to the first measuring path 37a.

The analysis and measurement unit 42 comprises a memory device 43 for storing measurement and analysis results and/or for storing specific analysis parameters. Once the respective powers have been measured, the analysis and measurement unit 42 may compare at least one predefined threshold value stored in the memory 43 with a difference in power of the signals X4a, X4b, namely the difference in power of the small bandwidth signal X4b and the high bandwidth signal X4a. Alternatively or additionally, the analysis and measurement unit 42 may compare at least one predefined threshold value with the absolute power of the small bandwidth signal X4b and/or the high bandwidth signal X4a.

The analysis and measurement unit 42 is connected to a display 44 that is located at an outer side of the housing 31 or a location remote to the apparatus 30 (not shown in FIG. 4) so that the obtained information is made visible for the user of the apparatus 30.

In some embodiments, different warning notifications may be displayed on the display 44 due to any analyzing results so as to warn the user with regard to a certain predefined setting of the apparatus 30. For instance, the user may be warned with regard to a wrong or at least not suitable setting of the adjustable attenuator and/or a wrong or at least not suitable frequency range selected for the small bandwidth signal X4b. A warning may also be displayed due to a too high power measured, e.g. a too high power of the wide bandwidth signal X4a. This warning notifications may correspond to an overload warning.

In an embodiment, the analysis and measurement unit 42 may also be directly connected via a feedback control line 45 to the adjustable attenuator 35. This way, the adjustable attenuator 35 may be controlled by the analysis and measurement unit 42. In some embodiments, the analysis and measurement unit 42 is configured to automatically control the adjustable attenuator 35 so that a wrong or unsuitable setting of the attenuator 35 may be effectively avoided.

In another embodiment, the apparatus 30 may comprise a user interface 46. The user interface 46 may also be arranged remote to the apparatus 30 (not shown in FIG. 4). By employing the user interface 46, a user may set some measurement parameters. In particular, a user may set a specific frequency range of the analysis and measurement unit 42. This may be done by suitably adjusting the adjustable setting of the down-converter 39 and/or the filter 41. The setting of the down-converter 39 and/or the filter 41 may additionally or alternatively be done by the analysis and measurement unit 42.

For instance, a testing scenario is applied in which different small bandwidth ranges are tested in a subsequent manner so that the at least one tunable measurement path 37b is tuned differently, for example in a subsequent manner.

The power of the wide bandwidth signal may relate to an average power of the wide bandwidth signal processed by the at least one measurement path 37a. Alternatively, the power of the wide bandwidth signal X4a corresponds to a peak value of the power of the wide bandwidth signal X4a determined. The user may select whether the power shall be averaged or the peak value shall be used for analyzing purposes, for example for the comparison.

In some embodiments, the apparatus 30 provides a combined power meter. The combined power meter or rather apparatus 30 is configured to measure the broadband signal while simultaneously measure the power of a narrowband signal. The respective measured powers may be displayed simultaneously on the display 44, stored in the memory 43 or forwarded to another external device.

The narrowband signal may correspond to a narrowband signal portion of the received broadband RF signal X1 wherein the narrowband frequency range of the narrowband can be set.

The apparatus 30 may also provide a reference circuit 47 so as to calibrate the device under test connected to the apparatus via I/O interface 34.

Figure 5:
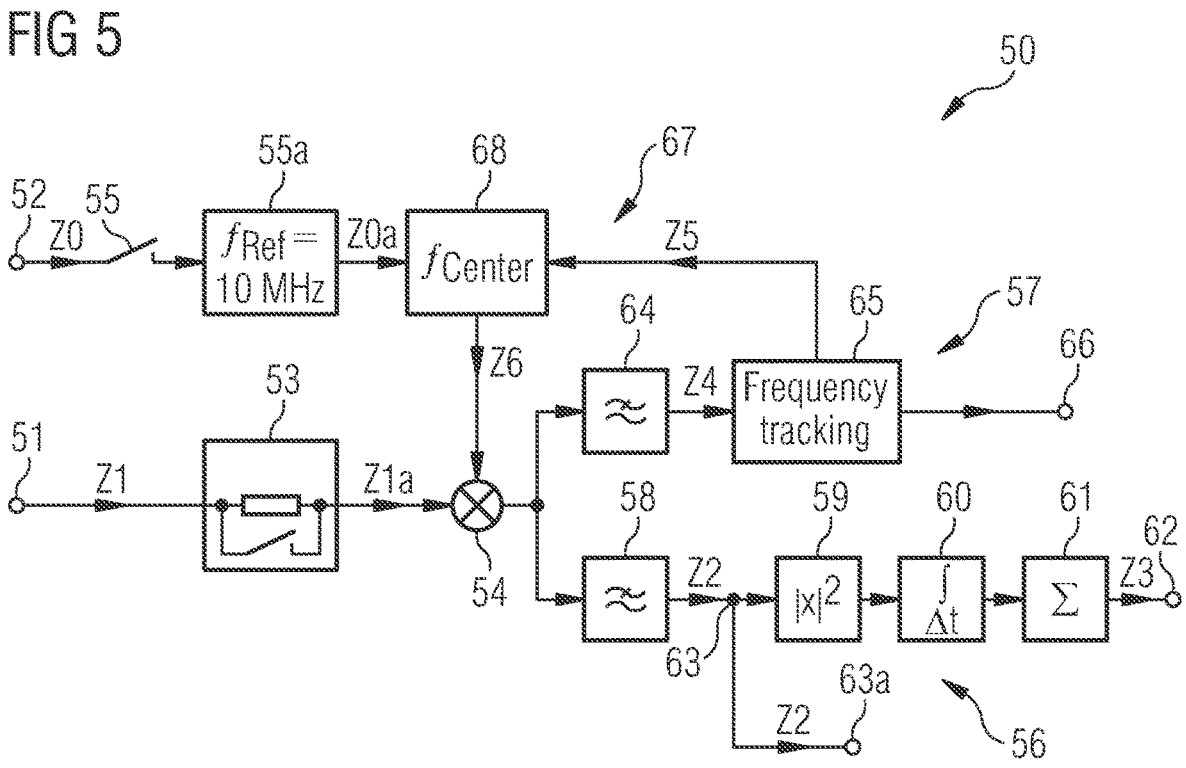
FIG. 5 shows a receiver-based power sensor.

FIG. 5 shows a receiver-based power sensor which is denoted by reference numeral 50. The power sensor may be part of the RF waveform recorder 15.

The power sensor 50 comprises a first input terminal 51 for receiving at least one RF input signal Z1 and a second input terminal 52 for receiving a reference RF signal Z0. The first input terminal 51 may be an N type connector and the second input terminal 52 may be a SMA connector.

An RF input attenuator 53 is arranged downstream the first input terminal 51. The attenuated RF input signal Z1a is provided to a mixer circuit 54.

In the reference path, a switch 55 is provided which is configured to feed the reference RF signal Z0 to an oscillator circuit 55a which is configured to generate a reference RF signal Z0a, e.g. of 10 MHz. In an initial state, the switch 55 is closed so that the generated reference signal Z0a is provided directly to the mixer circuit 54.

The power sensor 50 comprises a first sensing path 56 and a second sensing path 57. The first sensing path 56 is configured to estimate the frequency of the RF input signal Z1 and the second sensing path 57 is configured to sense the (envelope) power of the RF input signal Z1.

For this purpose, the first sensing path 56 comprises a first resolution bandwidth (RBW) filter 58 that is configured to provide a frequency span of the filter that is applied to the input signal. The resolution bandwidth is the width of the bandpass filter that is swept across the frequency range. The resolution bandwidth is a qualitative measure of the minimum separation required between two frequency components to be able to visually separate them. The RBW filtered RF signal Z2 is then provided to a square circuit 59, an integration circuit 60 and an averaging circuit 61 which one after the other are squaring, integrating and averaging the RBW filtered RF signal Z2. At a first output terminal 62 of the power sensor 50, a power signal Z3 is provided for further analysis.

The first sensing path 56 further comprises a tap 63 between the RBW filter 58 and the square circuit 59 for tapping off the RBW filtered RF signal Z2. This RBW filtered RF signal Z2 which is provided to a second output terminal 63a may also be used for further analysis of the resolution bandwidth.

The second sensing path 57 comprises a second RBW filter 64 and a downstream arranged frequency tracking circuit 65. The frequency tracking circuit 65 is configured to track and analyze the frequency of the RBW filtered RF signal Z4 provided by the RBW filter 64 and to derive an estimated frequency thereof which is provided to a third output terminal 66.

The power sensor 50 further comprises a feedback loop 67. The feedback loop 67 comprises a center frequency circuit 68 that is arranged between the frequency tracking circuit 65 and the mixer circuit 54. In the steady state, the switch 55 is opened and the center frequency circuit 68 receives only an RF signal Z5 from the frequency tracking circuit 65 which is configured to determine the center frequency thereof. This center frequency is applied as a reference frequency signal Z6 to the mixer circuit 54.

Figure 6:
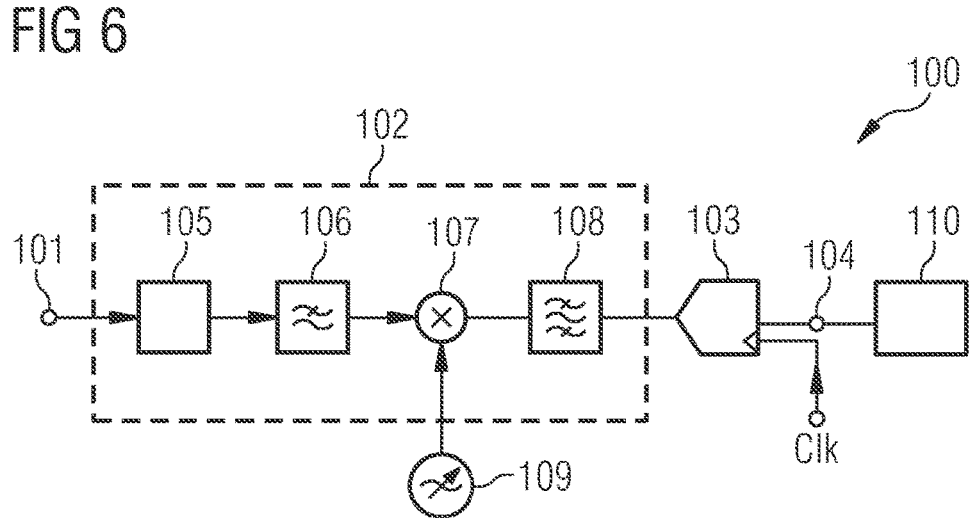
FIG. 6 shows another example of a test and measurement instrument.

FIG. 6 shows another example of a test and measurement instrument.

The test and measurement instrument 100 in FIG. 6 is preferably a spectrum analyzer, in particular for cable and antenna measurement, however, also other applications may be possible such as a mixed domain oscilloscope.

The spectrum analyzer 100 shown in FIG. 6 comprises an RF input 101 for receiving an RF input signal. The spectrum analyzer 100 can have one or more channels or RF inputs 101.

The spectrum analyzer 100 comprises a front-end circuit 102 for acquiring and processing one or more RF input signals. The front-end circuit 102 is connected via an analog-to-digital converter (ADC) 103 to an output terminal 104.

The front-end circuit 102 may comprise a series connection of a preamplifier circuit 105, a preselection circuit 106, a mixer 107 and at least one filter stage 108.

The preamplifier circuit 105 is configured to amplify the received RF input signal in order to provide a reference level for the received RF input signal. The amplified RF input signal is then suitably processed by the preselection circuit 106. The preselection circuit 106 may be a tunable low-pass filter 106.

The output of the tunable low-pass filter 106 can be fed to the mixer 107. The mixer 107 is configured to mix a local oscillator signal provided by the local oscillator 109 with the filtered signal from the preselection circuit 106 to produce a mixed signal. Preferably, the local oscillator 109 is tunable and may be triggered by suitable clock reference generator (not shown in FIG. 6). The mixed signal is then fed to the filter stage 108. The filter stage 108 is preferably at least one intermediate frequency (IF) filter which may comprise one or more band-pass filters 108. Preferably, at least one of the band-pass filters 108 is tunable.

The frequency bands of the low-pass filter 106 and the band-pass filter 108 may have overlapping frequency ranges, which can be predefined or otherwise programmed.

One or more high-speed analog-to-digital converters 103 can digitize the signal received from the filter stage 108 and produce a digitized measurement signal which is provided to the output terminal 104. This digitized measurement signal may be presented at a display 110.

In the example illustrated in FIG. 6, the spectrum analyzer 100 comprises only one signal path. It goes without saying that the front-end circuit 102 of the test and measurement instrument 100 can be extended by connecting several signal paths in parallel, for example for measuring different frequency bands or channels. These multiple signal paths can, for example, be connected or disconnected in a suitable manner via a multiplexer or, for example, by means of controlled switches.

While certain components of the spectrum analyzer 100 are shown directly coupled to each other, it should be understood that the spectrum analyzer 100 can include a variety of other circuit elements or software components, inputs, outputs and/or interfaces, which are not necessarily shown, but can be disposed between or otherwise associated with the illustrated components of the spectrum analyzer 100. For example, an attenuator circuit (not shown in FIG. 6) may be provided additionally or instead of the preamplifier circuit 105. It will be understood that the spectrum analyzer 100 or at least some of its components can be implemented by hardware, by software, and/or firmware, or any combination thereof.

Figure 7:
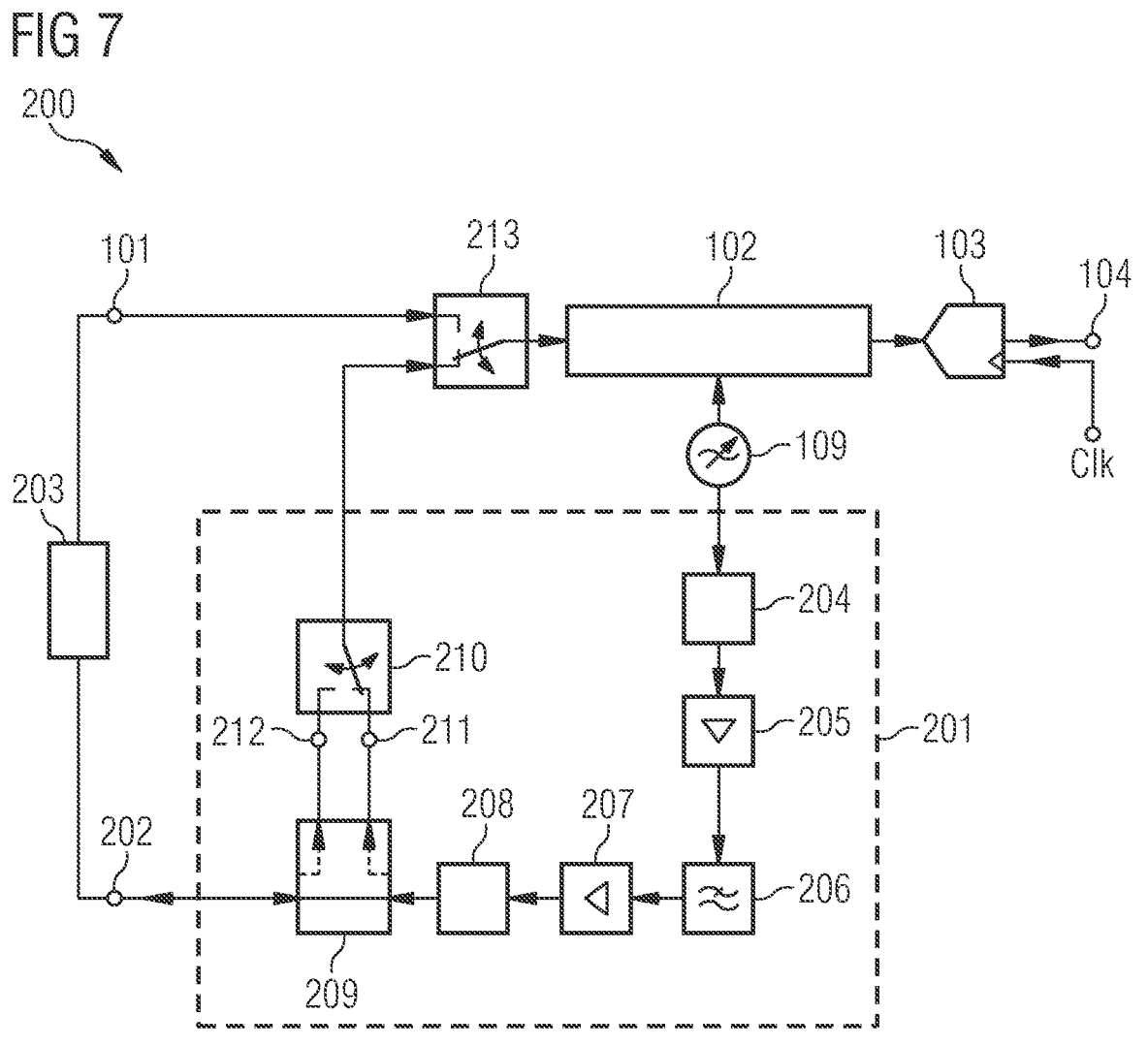

FIG. 7 shows another example of a test and measurement instrument. The test and measurement instrument 200 illustrated in FIG. 7 is preferably a spectrum analyzer 200, in particular for cable and/or antenna measurement.

In addition to the example shown in FIG. 6, the spectrum analyzer 200 shown in FIG. 7 comprises a tracking generator circuit 201 which typically forms a cost-effective solution. The tracking generator circuit 201 is connected between the local oscillator 109 and a tracking generator output 202. A device under test 203 may be connected between the tracking generator output 202 and the RF input 101.

The tracking generator circuit 201 comprises an attenuator 204, an amplifier 205, a low pass filter 206 a further optional amplifier 207, a level setting circuit 208, a return loss bridge circuit 209 and a first switching circuit 210.

The attenuator 204 and the amplifier 205 are configured to attenuate and amplify the local oscillator signal provided by the local oscillator 109. The produced signals is then filtered by the low pass filter 206 and optionally additionally amplified by the amplifier 207. In the level setting circuit 208, a specific level is produced and then fed to the return loss bridge circuit 209.

The return loss bridge circuit 209 is the core of the tracking generator circuit 201. The return loss bridge circuit 209 comprises a bridging connection which is configured to provide a through connection from the level setting circuit 208 to the tracking generator output 202 so that the signal produced by the level setting circuit 208 is forwarded to the device under test 203. The return loss bridge circuit 209 further comprises a first tap 211 for directly tapping the signal from the level setting circuit 208 and a second tap 212 for tapping the reflection signal from the tracking generator output 202. The tracking generator output 202 provides to the return loss bridge circuit 209 a reflection portion of the original signal of the level setting circuit 208 which is reflected by the device under test 203.

The first switching circuit 210 is configured to switch between the first tap 211 and the second tap 212 for receiving the originally processed signal or a reflection portion thereof, respectively, which is then forwarded to a second switching circuit 213. This second switching circuit 213 is configured to receive either the reflected or non-reflected signal provided from the tracking generator circuit 201 or to receive the original RF input signal via the input terminal 101.

Spectrum analyzers, such as the ones shown in FIGS. 6 and 7, are passive instrument that are configured to receive and measure RF signals. As such, spectrum analyzers, by themselves, are not able to make cable and antenna measurements that require known signals to be applied to a particular DUT in order to measure the output or response. There are two main types of test equipment used for making these stimulus-response measurements. The traditional type of test equipment is an RF or vector network analyzer (VNA). The other option is a spectrum analyzer with a tracking generator. A vector network analyzer is typically required if exceptional accuracy is needed, but in most other cases a spectrum analyzer and tracking generator arrangement is an excellent and in particular pretty cost effective alternative solution.

A tracking generator 201 operates by providing a suitably processed sinusoidal output signal provided for example by a local oscillator 109 to the input 101 of the spectrum analyzer 100. By linking the sweep of the tracking generator 201 to the spectrum analyzer 100, the output signal of the tracking generator 201 comprises basically the same or at least an similar frequency as the spectrum analyzer 100, and the two units track the same frequency. The return loss bridge circuit 209 is the circuit component that now allows reflections of the generated signal to be detected by the spectrum analyzer 100. Connecting the output 202 of the tracking generator 201 to the input 101 of the spectrum analyzer 211, such as during normalization, results in a single flat line, with the level representing the reference loss of the direct connection. For measurements, an unknown device under test 203 is placed between the output 202 of the tracking generator 201 and the input 101 of the spectrum analyzer 100. The response of the device under test 203 alters the signal and this change is then measured by the spectrum analyzer 100.

The invention is not limited to physical devices or units implemented in non-programmable hardware, but can also be applied in programmable devices or units able to perform the desired device functions by operating in accordance with suitable program code. Furthermore, the devices may be distributed physically over a number of apparatuses and instruments, while functionally operating as a single device. Devices functionally forming separate devices may be integrated in a single physical device. Those skilled in the art will recognize that the boundaries between logic blocks or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same applies for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

LIST OF USED REFERENCE SYMBOLS 10 radio interference test system
11 aerial vehicle
11a bottom side of the aerial vehicle
12 radio device
13 test environment, test equipment
14 radio communication infrastructure
15 RF waveform recorder
16 memory device
17 mounting means
18 radar altimeter
18a altimeter antenna
18b validation module
19a remote module
19b test software module
19c test routine
20 airport area, landing zone
21 approach area (in the area around the airport or landing zone)
22 base station, ground-based transmitter station
23 ground
24 (approaching) civil aircraft
25 approach route
26 predefined positions
30 apparatus for measuring and analyzing a radio frequency (RF) signal
31 housing
32 electric and electronic components
33 input
34 I/O interface
35 attenuator
36 splitter
37a measurement path for wide bandwidth
37b measurement path for small bandwidth
38 sampler
39 down-converter
40 sampler
41 filter
42 analysis and measurement unit
43 memory
44 display
45 feedback control line
46 user interface
47 reference circuit 50 power sensor
51 first input terminal
52 second (reference) input terminal
53 RF input attenuator
54 mixer circuit
55 switch
55a oscillator circuit
56 first sensing path
57 second sensing path
58 first resolution bandwidth (RBW) filter
59 square circuit
60 integration circuit
61 averaging circuit
62 first output terminal
63 tap
63a second output terminal
64 second RBW filter
65 frequency tracking circuit
66 third output terminal
67 feedback loop
68 center frequency circuit
S0-S3 steps
S21-S23 sub-steps
X1 received RF signal
X2 attenuated RF signal
X3a, X3b split analog signals
X4a, X4b digitized bandwidth signals
Z0 reference RF signal
Z0a generated reference RF signal Z0a
Z1 RF input signal
Z1a attenuated RF input signal Z1a
Z2 RBW filtered RF signal
Z3 power signal
Z4 RBW filtered RF signal
Z5 RF signal
Z6 reference frequency signal
100 test and measurement instrument, spectrum analyzer
101 RF input
102 front end circuit
103 analog-to-digital converter, ADC
104 output terminal
105 preamplifier circuit
106 preselection circuit, tunable low-pass filter
107 mixer
108 filter stage, band-pass filter
109 (tunable) local oscillator
110 display
200 test and measurement instrument, spectrum analyzer
201 tracking generator circuit
202 tracking generator output
203 device under test
204 attenuator
205 amplifier
206 low pass filter
207 amplifier
208 level setting circuit
209 return loss bridge circuit
210 first switching circuit
211 first tap
212 second tap
213 second switching circuit

I claim:

1. A radio interference test system configured to record lively and to replay radio frequency, RF, inferences from air, the radio interference test system comprising:

an aerial vehicle that is either an unmanned aerial vehicle or a test aerial vehicle, the aerial vehicle comprising a radio communication infrastructure;

a radio device which is configured to request for a wireless communication connection to the radio communication infrastructure;

a test environment which is configured to live record and replay the RF inferences from the air, the test environment comprising:

an RF waveform recorder arranged within the aerial vehicle wherein the RF waveform recorder is configured to receive the RF interferences generated by the radio communication infrastructure in response to the request for the wireless communication connection and wherein the RF waveform recorder is further configured to record a RF waveform from the RF interferences received;

a memory device which is configured to store an information which comprises the recorded RF waveform, wherein the radio communication infrastructure is an emulated communication infrastructure that is configured to emulate the radio communication infrastructure at a location of an airport.

2. The radio interference test system of claim 1, wherein a capacity limit of the aerial vehicle is configured such to carry components of the test environment only.

3. The radio interference test system of claim 1, wherein the test environment or at least the RF waveform recorder of the test environment comprises a remote module, wherein the test environment or the RF waveform recorder of the test environment, respectively, are configured to be remote controlled via the remote module.

4. The radio interference test system of claim 1, wherein the test environment or at least the RF waveform recorder of the test environment comprises a test software module which comprises a test routine, wherein the test software module is configured to operate the RF waveform recorder independently based on the test routine stored in the test software module.

5. The radio interference test system of claim 1, wherein the unmanned aerial vehicle is a drone.

6. The radio interference test system of claim 1, wherein the test aerial vehicle is a test helicopter or a test plane.

7. The radio interference test system of claim 1, wherein the unmanned aerial vehicle is configured to power at least one of:

at least one component of the test environment within the unmanned aerial vehicle;

the communication infrastructure.

8. The radio interference test system of claim 1, wherein the communication infrastructure is a communication infrastructure at the location of an airport or within the aerial vehicle.

9. The radio interference test system of claim 1, wherein the components of the test environment are at least partially part of the aerial vehicle.

10. The radio interference test system of claim 1, wherein the RF waveform recorder includes at least one of:

a power meter;

a digitizer;

a vector signal analyzer;

a signal analyzer;

a spectrum analyzer;

an oscilloscope.

11. The radio interference test system of claim 1, wherein the RF waveform recorder is a miniaturized RF waveform recorder that is installed in the unmanned aerial vehicle.

12. The radio interference test system of claim 1, wherein the communication infrastructure or the RF waveform recorder within the aerial vehicle comprises the memory device.

13. The radio interference test system of claim 1, wherein the radio device and the communication infrastructure each comprise an embedded SIM.

14. The radio interference test system of claim 1, wherein the memory device is an electronic data storage unit which is configured to store the information which comprises the recorded RF waveform.

15. The radio interference test system of claim 1, further comprising a radar altimeter that comprises an altimeter antenna, wherein the altimeter antenna is mounted at a bottom side of the aerial vehicle.

16. The radio interference test system of claim 15, wherein the radar altimeter further comprises a validation module that is configured to at least qualify or validate radar altimeter readings.

17. A radio interference test system configured to record radio frequency, RF, inferences lively along a flight path, the radio interference test system comprising:

an aerial vehicle that is either an unmanned aerial vehicle or a test aerial vehicle, the aerial vehicle comprising a radio communication infrastructure;

a RF waveform recorder that is configured for arrangement within the aerial vehicle and the RF waveform recorder is further configured to match a capacity limit of the aerial vehicle, a memory device which is configured to store an information which comprises a recorded RF waveform; and a radio device which is configured to request for a wireless connection to the radio communication infrastructure, wherein the communication infrastructure is an emulated radio frequency communication infrastructure that is configured to emulate the radio frequency communication infrastructure at a location of an airport.

18. A radio interference test method for live recording and replaying radio frequency, RF, inferences from air, the radio interference test method comprising:

providing an aerial vehicle that is either an unmanned aerial vehicle or a test aerial vehicle, the aerial vehicle comprising a radio communication infrastructure;

establishing a wireless communication connection to the radio communication infrastructure using a radio device;

live recording and replaying the RF inferences from the air, comprising:

receiving RF interferences generated by the radio communication infrastructure in response to a request for the wireless communication connection;

recording a RF waveform from the RF interferences received; and storing an information which comprises a recorded RF waveform, wherein the communication infrastructure is an emulated radio frequency communication infrastructure that is configured to emulate the radio frequency communication infrastructure at a location of an airport.

19. The method of claim 18, comprising at least one of the steps:

during test, controlling from ground a flightpath of the aerial vehicle;

automating a flightpath of the aerial vehicle via waypoints;

controlling from the ground the recording of the RF inferences;

controlling the recording of the RF inferences independently based on a test routine stored in a test software module within the aerial vehicle.

20. The method of claim 19, further comprising at least one of the steps:

replaying the recorded RF waveform in a lab for various aerial systems that are subject to interference from the recorded RF waveform;

replaying the recorded RF waveform in a the lab for various other aerial vehicles that are subject to the interference from the recorded RF waveform;

qualifying and validating radar altimeter readings, in particular in case at least one interference signal in the surrounding of the test environment or the aerial vehicle, respectively, is identified.

* * * * *